United States Patent
Bedard et al.

(10) Patent No.: US 8,388,735 B2
(45) Date of Patent: Mar. 5, 2013

(54) ADSORBENT MEDIA WITH LI EXCHANGED ZEOLITE

(75) Inventors: Robert L. Bedard, McHenry, IL (US); Evgeny T. Kolev, Mount Prospect, IL (US)

(73) Assignee: UOP LLC, Des Plaines, IL (US)

(*) Notice: Subject to any disclaimer, the term of this patent is extended or adjusted under 35 U.S.C. 154(b) by 94 days.

(21) Appl. No.: 13/133,245

(22) PCT Filed: Sep. 1, 2009

(86) PCT No.: PCT/US2009/055566
§ 371 (c)(1),
(2), (4) Date: Jun. 7, 2011

(87) PCT Pub. No.: WO2010/077392
PCT Pub. Date: Jul. 8, 2010

(65) Prior Publication Data
US 2011/0232486 A1 Sep. 29, 2011

Related U.S. Application Data

(60) Provisional application No. 61/138,313, filed on Dec. 17, 2008, provisional application No. 61/138,324, filed on Dec. 17, 2008.

(51) Int. Cl.
*B01D 53/02* (2006.01)
(52) U.S. Cl. ............ 95/130; 96/108; 96/154; 95/138; 95/900; 502/60; 502/62; 502/64; 502/79
(58) Field of Classification Search ............ 95/90, 130, 95/138; 96/108, 134, 154; 502/60, 62, 64, 502/79
See application file for complete search history.

(56) References Cited

U.S. PATENT DOCUMENTS

| | | | | |
|---|---|---|---|---|
| 5,152,813 A | * | 10/1992 | Coe et al. | 95/103 |
| 5,179,051 A | * | 1/1993 | Bedard et al. | 501/128 |
| 5,302,362 A | * | 4/1994 | Bedard | 423/306 |
| 5,449,450 A | * | 9/1995 | Bedard | 208/46 |
| 5,658,370 A | * | 8/1997 | Vigor et al. | 95/96 |
| 5,958,817 A | * | 9/1999 | Leavitt | 502/64 |
| 6,274,528 B1 | * | 8/2001 | Labasque et al. | 502/79 |
| 6,328,786 B1 | * | 12/2001 | Labasque et al. | 95/96 |
| 6,350,298 B1 | * | 2/2002 | Su et al. | 95/96 |
| 6,461,412 B1 | | 10/2002 | Jale | |
| 6,521,019 B2 | | 2/2003 | Jain | |
| 6,596,256 B1 | * | 7/2003 | Ojo et al. | 423/700 |
| 6,652,626 B1 | * | 11/2003 | Plee | 95/96 |
| 7,592,284 B2 | * | 9/2009 | Zaki et al. | 502/60 |
| 2001/0021368 A1 | * | 9/2001 | Masini et al. | 423/700 |
| 2002/0031472 A1 | * | 3/2002 | Masini et al. | 423/700 |
| 2003/0103887 A1 | * | 6/2003 | Stephenson | 423/239.2 |

* cited by examiner

*Primary Examiner* — Duane Smith
*Assistant Examiner* — Christopher P Jones
(74) *Attorney, Agent, or Firm* — Kurt D. Van Tassel

(57) ABSTRACT

An adsorbent media composition has a finished media lithium-exchanged zeolite X (LiX) with a finished Li content in a range from 96% to 83%, based on the total cation equivalents in the LiX. The adsorbent media composition is obtained from a slurry comprising water, a LiX precursor having a pre-media production Li content that is greater than the finished media LiX Li content, and another media component material, such as fibers. The water used to produced the media has a specific conductance in a range from 2.2 μSiemens/cm to 150 μSiemens/cm. The finished media LiX has a monovalent cation (Na, K, Rb, Cs and combinations thereof) in a range from 0.05% to 3%, based on the total equivalents of exchangeable cations in the finished media LiX.

9 Claims, No Drawings

ADSORBENT MEDIA WITH LI EXCHANGED ZEOLITE

STATEMENT OF PRIORITY

This national stage application, filed under 35 U.S.C. §371, claims benefit of priority, under 35 U.S.C. §365, of International Application No. PCT/US2009/055566 filed Sep. 1, 2009, which claims benefit of priority of U.S. Provisional Application Nos. 61/138,313 and 61/138,324, both filed on Dec. 17, 2008.

FIELD OF THE INVENTION

The disclosure relates to adsorption systems. In particular, it is an adsorbent media for use in adsorption systems.

DESCRIPTION OF RELATED ART

Adsorption systems, such as HVAC systems, liquid and gas purification, solvent and gasoline vapor recovery and deodorization, sorption cooling processes, certain bulk gas separations, etc., sometimes use adsorption media to remove gas phase impurities or more strongly adsorbed major components in a gas mixture. Adsorption processes and sorption cooling processes typically employ some adsorbent media disposed in a metal vessel, which may be self-supporting or contained on a metal screen or surface. The adsorbent is in contact with a fluid or gas stream containing an adsorbable component over the range of conditions necessary for adsorption.

Cyclic adsorption processes are frequently used to separate the components of a gas mixture. Typically, cyclic adsorption processes are conducted in one or more adsorbent vessels that are packed with a particulate adsorbent material that adsorbs at least one gaseous component of the gas mixture more strongly than it adsorbs at least one other component of the mixture. The adsorption process comprises repeatedly performing a series of steps, the specific steps of the sequence depending upon the particular cyclic adsorption process being carried out.

In any cyclic adsorption process, the adsorbent bed has a finite capacity to adsorb a given gaseous component and, therefore, the adsorbent requires periodic regeneration to restore its adsorption capacity. The procedure followed for regenerating the adsorbent varies according to the process. In VSA processes, the adsorbent is at least partially regenerated by creating vacuum in the adsorption vessel, thereby causing adsorbed component to be desorbed from the adsorbent, whereas in PSA processes, the adsorbent is regenerated at a lower pressure than the pressure used for the adsorption step. In both VSA and PSA processes, the adsorption step is carried out at a pressure higher than the desorption or regeneration pressure.

Some conventional adsorption media are comprised of a thin sheet or layer such as paper, metal foils, polymer films, etc., and an adsorbent material such as silica gel, activated alumina, activated carbon and molecular sieves such as zeolites. These adsorbent sheets or layers are relatively thin compared to conventional beads, extrudates, or granules. Because thinner media provides a shorter path length from the gas or liquid phase feed to the adsorption site, the mass transfer through these adsorbents is faster than in beads or granules. In addition, the macropore size distribution, particularly in wet laid adsorbent-containing paper, can be roughly an order of magnitude larger than in a typical adsorbent bead. This larger macropore size also increases the mass transfer of the media relative to beads or granules.

Lithium-containing molecular sieves, such as Li-containing zeolite X (LiX), are often used in an air separation process to selectively adsorb nitrogen ($N_2$) over oxygen ($O_2$).

Lithium (Li) has higher charge density versus other larger monovalent cations (e.g., Na, K, Cs, etc.) or divalent cations (e.g., Mg, Ca, Ba, etc.). Lithium's higher charge density enhances its interaction with nitrogen's quadrupole moment—arising from the covalent triple-bond between N atoms in the nitrogen molecule. Accordingly, in an air separation process using LiX, for example, $N_2$ is preferentially adsorbed by the LiX and an enriched $O_2$ product stream is produced during the adsorption step.

Generally, molecular sieves (i.e., zeolites) will contain either protons or monovalent cations, such as Na, divalent cations, such as Ca, or trivalent cations such as La, to provide charge balance to their framework, such as $SiO_2/Al_2O_3$ framework. Accordingly, to improve a zeolite's selectivity for more polar or polarizable compounds such as $N_2$, the zeolite undergoes an ion-exchange (IEX) treatment with an aqueous Li salt (e.g., LiCl, $LiNO_3$, LiOH, etc.) solution.

However, if the water used in subsequent processing of the Li-exchanged zeolite contains cations, such as Na, Ca and Mg—typically found in many water supplies—these cations will preferentially displace Li in the zeolite. In turn, this will cause a decrease in the Li content of zeolite and consequently decrease the exchanged zeolite's sorption selectivity and capacity for $N_2$ versus $O_2$, for example. For example, this particular problem is faced when using a LiX to produce an adsorbent media from aqueous slurry mixtures, such as a LiX-containing paper.

Therefore, it's been believed by those skilled in the art of zeolite IEX that it's important to use deionized ("DI") or distilled water to avoid the adverse IEX effect arising from competing cations, such as Na, Ca and Mg (e.g., see U.S. Pat. No. 6,461,412). According to the American Chemical Society ("ACS") Specifications (Reagent Chemicals, $8^{th}$ Ed. 1993)—a leading authority for the standard for reagent chemicals—the requirement for DI and distilled water is rigorous.

Specifically, the maximum allowable limit for DI or distilled water under the ACS Specifications in accordance with the following analytical measurements is:

| | |
|---|---|
| Specific conductance at 25° C. | $2.0 \times 10^{-6}$ $ohm^{-1}$ $cm^{-1}$ (2.0 μSiemens · $cm^{-1}$)* |
| Silicate (as $SiO_2$) | 0.01 ppm |
| Heavy Metals (as Pb) | 0.01 ppm |
| Substances reducing permanganate | Passes test |

*Conversion to μSiemens · $cm^{-1}$ added.

However, production of deionized or distilled water in the volumes typically needed for larger scale production of a zeolite-containing adsorbent media, for example, paper media such as a lithium zeolite containing paper, can be burdensome and costly. Accordingly, there is need for an improved process for wet-laying a lithium-containing zeolite paper that averts the strict requirement of using either DI or distilled water as the exclusive water source and accordingly, an improved zeolite-containing adsorbent media product made therefrom.

SUMMARY OF THE INVENTION

According to one aspect of the present invention, there is provided an adsorbent media composition comprising: a first media component material; a second media component material having at least 30 weight percent of an adsorbent composition comprising a finished media lithium-exchanged zeolite X (LiX), the finished media LiX having a finished Li content, wherein the finished media LiX is derived from a LiX precursor having a pre-media production Li content; wherein
(a) the finished media LiX Li content is reduced relative to the LiX precursor Li content,
(b) the finished media LiX Li content is in a range from 96% to 83%, based on the total cation equivalents in the LiX, and
(c) the adsorbent media composition is obtained from a slurry mixture comprising water, the pre-media production LiX and the first media component material, wherein
   (i) the water has a specific conductance in a range from 2.2 $\mu$Siemens/cm to 150 $\mu$Siemens/cm; and
   (ii) the finished media LiX has a monovalent cation content in a range from 0.05% to 3%, based on the total equivalents of exchangeable cations in the finished media LiX, wherein the monovalent cation is selected from the group consisting of Na, K, Rb, Cs, and combinations thereof.

DETAILED DESCRIPTION

As noted above, heretofore, those skilled in the art have believed that monovalent and divalent cations present in process water would displace Li in Li-containing zeolite and thereby degrade the zeolite's sorption selectivity and capacity for $N_2$ versus $O_2$, for example. As discussed more fully in the examples below, surprisingly and unexpectedly, applicants have discovered that a certain concentration of both monovalent and divalent cations can be present in the process water used in the manufacture of adsorbent media such as, for example, a LiX-containing paper media without materially degrading the adsorbent media's sorption selectivity and capacity. Monovalent cations that may be present in the process are group 1 (formerly, IA) alkali metals selected from the group consisting of Na, K, Rb, Cs, and combinations thereof. Divalent cations that may be present in the process are group 2 (formerly, IIA) alkaline earth metals selected from the group consisting of Mg, Ca, Sr, Ba and combinations thereof.

Accordingly, as discussed more fully below, non-DI water having one or more of the aforementioned cations and a specific conductance ("SC") in a range from 2.2 $\mu$Siemens·cm$^{-1}$ ($\mu$S/cm) to as high as 150 $\mu$S/cm ("NDISC water") can be used in a process for wet-laying a Li-containing zeolite paper, for example. Furthermore, the adsorbent media made from a process using NDISC water can have from 0.01% up to 3% of certain monovalent cations and from 0.01% up to 15%, in terms of ion exchange equivalents, of certain divalent cations, while maintaining the adsorbent media's sorption selectivity and capacity within acceptable performance limits.

Paper Media Overview

One example of adsorbent media is a paper media (e.g., paper sheet or layer), or more specifically, a Li—X containing paper media. After the paper media is made it can be formed into an array of different objects. One example is as a spirally wound element containing inter-leaving spacers to facilitate gas flow between adjacent layers of the paper media (e.g., see U.S. Pat. No. 6,176,897). A second example is a multi-layered media wheel or monolith with alternating layers of flat and corrugated adsorbent paper providing open-ended passages parallel to the axis of rotation permit gas flow therethrough (e.g., see U.S. Pat. No. 5,685,897 and U.S. Pat. No. 6,231,644). A third example is formation of the paper media into an irregular or regular honeycomb-type structure, which permits gas flow through the chambers forming the honeycomb structure (e.g., see U.S. Pat. No. 4,012,206). The adsorbent media can be formed into other forms and shapes apparent to those skilled in the art.

Likewise, the adsorbent media can be made using a variety of methods apparent to those skilled in the art. Paper making techniques are frequently used for making zeolite-containing paper. Accordingly, the process for making paper media, such as LiX paper media, will now be described for non-limiting, illustrative purposes only.

Generally, paper media is prepared from a natural or synthetic fiber material. This fiber material can be combined with the adsorbent and wet-laid into a continuous sheet or handsheet. This wet-laying is achieved by forming a slurry of the fiber, the adsorbent and typically one or more binder components in water. And in the case of the inventive process using NDISC water. This slurry can then be transferred to a handsheet mold, laboratory paper machine, or to a head box of a continuous wire paper machine for discharging or laying onto a Fourdrinier or Twin-Wire paper machine, for example. The adsorbent comprises a zeolite alone or perhaps in combination with silica gels or alumina, depending on the intended application. Other additives may also be included to such as materials to enhance the paper media.

More specifically, a slurry is first formed in a mixing container—typically a mild steel, stainless steel tank or a polymer-lined vessel—using NDISC water, fibers and at least a precursor zeolite powder (e.g., LiX powder), and optionally a binder material. Using NDISC water will keep the reduction in the Li content of the LiX in a finished paper media relative to the Li content in the precursor LiX—before paper media production process is begun—in a range from 0.01% to 15%. Again, as noted above, although some Li cations can be displaced by a certain percentage of monovalent and divalent cations, respectively, NDISC water will preserve a sufficient Li content in the zeolite (e.g., LiX) of the finished paper media so that its sorption selectivity and capacity (e.g., for $N_2$ versus $O_2$) remains acceptable.

Slurry Make-Up Generally

Generally, a slurry is made by dispersing a fiber, which can be either synthetic or natural, in NDISC water. A small amount of LiOH is then added to the slurry to give a concentration of $1\times10^{-2}$ M to prevent decationization, or unwanted replacement of Li cations in the zeolite with protons. The adsorbent material, which includes at least a zeolite, is then added to the fiber, dilute lithium hydroxide slurry either in the powder form or by mixing with water. In subsequent stages, an optional binder, a retention aid and/or pore filling agent can also be added to the slurry mixture.

Fibers

Regarding fiber materials used to make adsorbent media, particularly a paper media, any type of fibrous material can be used that can be fibrillated and thereafter formed by standard paper-making processes into adsorbent paper. Fibrillated fiber as used herein means fiber shafts which are split at their ends to form fibrils, i.e., fine fibers or filaments much freer than the fiber shafts. Examples of fibrillated fibers include natural fibers such as wood pulp or cellulosic fibers, and synthetic fibers and mixtures thereof.

Examples of fibrillated and non-fibrillated synthetic organic fibers include polymeric fibers selected from the group of high-density polyethylenes, high-density polypropylenes, aromatic polyamides (aramids), polystyrenes, aliphatic polyamides, polyvinyl chlorides, polyesters, nylons, rayons (cellulose acetate), acrylics, acrylonitrile homopolymers, copolymers with halogenated monomers, styrene copolymers, and mixtures of polymers (polypropylene with low-density polyethylene, and high-density polyethylene with polystyrene).

Fibrillated and non-fibrillated synthetic fibers often used in making paper media include aramid and acrylic fibers. One type of aramid fiber is formed from a long-chain synthetic aromatic polyamide having at least 85% of the amide (—CO—NH—) linkages directly attached to the two aromatic rings. One example of an aramid fiber available from E. I. du Pont de Nemours & Company (DuPont) is KEVLAR® 303. In forming fibrillated KEVLAR®, high shear is applied to KEVLAR® fiber shafts which split at their ends into fibrils to create a tree-like structure. In the production of paper media, the fibrils interlock to enhance the paper strength and provide increased area for capturing or securing adsorbent particles. KEVLAR® is stable in oxidizing atmospheres up to 450° C. Other high-temperature aramid fibers such as NOMEX®, TWARON® and TEIJINCONEX® are available from Du Pont, AKZO Fibers Inc., and Teijin Twaron.

Acrylic fibers such as CFF® fibrillated acrylic fibers from Sterling Fibers may also be used alone or in combination with aramid fibers.

Non-fibrillated inorganic fibers, such as glass or metal fibers and rock wool, etc., may be used in combination with fibrillated organic fibers. The amount of fibrillated and non-fibrillated fibers can be adjusted to suit the particular need including the use of up to 100% fibrillated fibers.

If the fibers are not available in fibrillated form, fibers can be fibrillated by transferring a slurry of the fibers to a disc or other high shear refiner to split the ends of the chopped fibers or shafts to provide fibrils thereon. In addition, fibrillated shafts available from the manufacturer can be further refined to increase the degree of fibrillation on the shafts which results in a higher degree of interlocking and consequently stronger paper media.

Generally, the shafts or chopped fibers are provided in a length in the range of 1 to 30 mm, and typically in the range of 3 to 15 mm, prior to fibrillation. Further, generally the shafts or chopped fibers have a diameter in the range of 1 to 50 microns, and typically 5 to 25 microns, prior to fibrillation. In fibrillated form, the chopped fibers have fibrils extending therefrom generally having lengths in the range from 0.5 to 28 mm and diameters in the range from 0.5 to 40 microns and more typically lengths in the range from 1 to 10 mm. and diameters in the range from 1 to 10 microns.

Zeolites

Molecular sieves include zeolite molecular sieves. Zeolites are crystalline aluminosilicate compositions that are microporous and have a three-dimensional oxide framework formed from corner-sharing $AlO_2$ and $SiO_2$ tetrahedra. Both naturally occurring and synthetic zeolites can be used in the media. However, at least a Li containing zeolite X, LiX, having a Si to Al ratio in the range from 1.0 to 1.5 is desirable where the adsorbent media will be used to selectively separate $N_2$ from a $N_2/O_2$ gas mixture. However, depending on the intended component separation, other zeolites or adsorbent materials including, without limitation, alumina, silica gel or activated carbon may be combined with the zeolite, whether LiX or another zeolite.

Non limiting examples of other zeolites are zeolite Y, A and beta. Faujasite-type Y zeolites include DDZ-70, Y-54, Y-74, Y-84, Y-85, steam calcined rare earth exchanged Y-54, low cerium rare earth exchanged Y-84, low cerium rare earth exchanged zeolite LZ-210.

Optional Binder & Retention Aids

Additives such as retention aids and binders suitable for maintaining the integrity of the paper media can be added to the slurry for purposes of improving paper media strength by bonding fiber shafts and fibrils together to form a matrix and for retaining the adsorbent on or within the fiber shafts and fibril matrix. Binders found suitable for use with acrylic fibers include acrylic latex, starch, polyvinyl alcohols/acetates, microcrystalline cellulose, for example, carboxymethyl cellulose.

Slurry Solids Content, Wet-Laying, Slurry Drainage & Paper Forming

The final slurry being used for wet laying can contain from 0.5 to 20% solids but preferably contains from 2.5 to 4% solids. Paper media can be formed by either making handsheets in a laboratory handsheet apparatus or using a Fourdrinier paper machine or other type of paper machine.

A handsheet mold consists of an open top vessel with square 12 by 12 inch wire screen at its bottom where the paper sheet can be formed. The vessel is hinged immediately above the screen so the paper can be peeled from the screen. Below the screen is a funnel which leads to a standpipe and valve. When the valve is opened, the standpipe, which is full of water, empties, pulling a vacuum on the pulp slurry above the screen. This causes the pulp mixture to deposit on the screen, forming the paper. The wet paper is normally pressed gently with blotter paper to remove additional moisture before it is pealed from the screen. It is then removed and dried on a hot metal surface, such as a photographic print drier, for example.

Alternatively, laboratory handsheets can be fabricated with a semiautomatic paper machine such as a Retention Tester available from Techpap. Handsheets fabricated on a Retention Tester are circular and 7 inches in diameter.

The Fourdrinier paper machine applies the same principles as the handsheet apparatus, but makes paper continuously by providing a moving wire (screen belt) which passes over a vacuum section to remove most of the water from the slurry and the paper that's formed accordingly. Before the paper is peeled from the wire, it normally travels over a wet press section where a porous roller may be used to squeeze additional moisture from the paper. Because the wire continuously moves, it can cause fiber orientation which imparts higher tensile strength in the machine direction than in the cross direction. The paper then passes to a series of large diameter steam-heated metal rollers (called cans) which dry the paper. The paper can then optionally be calendared or pressed at high pressure between two or more steel rollers to reduce caliper and increase paper density. Paper leaving the calendar rolls or heater cans is then wound on a core.

The viscosity of the slurry mixture, frequently described as the furnish (i.e., batch mixture), is adjusted to provide acceptably fast drainage rate and a high retention on the screen (usually >80%). Batch additives such as binders and flocculants are typically added at different parts of the process. Although 5 to 15% acrylic emulsion can be used as binder, other binders such as starch, polyvinyl alcohol/acetate (PVA), among others such as those noted above, can be used. Also, in the case where the adsorbent in the furnish is a lithium exchanged zeolite (e.g., LiX), to help reduce the extent to which Li is displaced by more strongly selective monovalent cations, 5 to 50 times the total moles of monovalent cations present in the process water are added as LiOH to the water. Preferably, the Li is added as LiOH. However, other forms of Li salts may be used along with the LiOH depending on other process or formulation conditions, such as, without limitation, $LiCl$, $LiBr$, $LiSO_4$, $LiNO_3$ or Li-acetate, provided LiOH is added to the water in sufficient quantities to adjust the pH between 9 and 10 to preclude decationization of the zeolite.

The paper media is typically produced into relatively thin, porous layer. So, tensile strength is an important property of the paper media, particularly where the paper media will be formed into a corrugated shape. Generally, a minimum tensile strength of 3 to 4 pounds/inch (525 to 700 N/m) of width is desired and preferably greater than 7 pounds/inch (1225 N/m) is desired for improving the paper media's resistance to stress of most corrugation processes.

Generally, the adsorbent media has a substantially uniform thickness and is 0.1 mm to 1.0 mm (0.004 to 0.04 inches) thick. Thus, the media is one-half (½) to one-twentieth (1/20) the thickness of adsorbent beads or granules. As such, the media provides a shorter diffusion path, which allows for a relatively faster rate of mass transfer into and out of the media.

The media comprises at least 30% (wt.) adsorbent. However, the actual adsorbent content is dependent on the thickness of the media. For example, the adsorbent content may be as high as 75-80% (wt.) if the final thickness, or caliper, of the media is at least 0.375 mm (0.15 in) thick. Preferably, the media is no more than 1.0 mm (0.04 in) thick and contains more than 60% (wt.) adsorbent. Preferably, the content of the adsorbent is in the range of from 60 to 85% (wt.).

In addition, the density of the adsorbent media is substantially uniform. The density and uniformity of the adsorbent media, such as a paper media, for example, is dependent on, without limitation, the furnish composition, wet-laying conditions, and calendaring conditions. Preferably, the density of the adsorbent media is in a range of from 0.5 to 1.1 g/cm$^3$.

Adsorption Process with Adsorbent Media

The adsorbent media of the present invention is advantageously used in an adsorption process, wherein a component of a gas mixture that is more strongly adsorbed than other components of the gas mixture is separated from the other components by contacting the gas mixture with the adsorbent media under conditions that effect adsorption of the strongly adsorbed component. Preferred adsorption processes include pressure swing adsorption (PSA), vacuum swing adsorption (VSA), temperature swing adsorption (TSA) and combinations thereof.

The temperature at which the adsorption step of the adsorption process is carried out depends upon a number of factors, such as the particular gases being separated, the particular adsorbent being used, and the pressure at which the adsorption is carried out. In general, the adsorption step of the process is carried out at a temperature of at least −190° C., preferably at a temperature of at least −20° C., and most preferably at a temperature of at least 0° C. The upper temperature limit at which the adsorption step of the process is carried out is generally 400° C., and the adsorption step is preferably carried out at temperatures not greater than 70° C., and most preferably carried out at temperatures not greater than 50° C.

The adsorption step of the process of the invention can be carried out at a pressure known to those skilled in the art of gas phase temperature swing adsorption and pressure swing adsorption processes. Typically the minimum absolute pressure at which the adsorption step is carried out is generally 0.7 bara (bar absolute), preferably 0.8 bara and most preferably 0.9 bara. The adsorption can be carried out at pressures as high as 50 bara or more, but is preferably carried out at absolute pressures, and preferably not greater than 20 bara, and most preferably not greater than 10 bar.

When the adsorption process is PSA, the pressure during the regeneration step is reduced, usually to an absolute pressure in the range of 0.1 to 5 bara, and preferably to an absolute pressure in the range of 0.175 to 2 bara, and most preferably to an absolute pressure in the range of 0.2 to 1.1 bara.

As indicated above, the process of the invention can be used to separate any two gases, provided that one of the gases is more strongly adsorbed by the adsorbents of the invention than is the other gas under either conditions of equilibrium or non-equilibrium, i.e., in the kinetic regime of a process. The process is particularly suitable for separating nitrogen from oxygen, nitrogen and argon from oxygen, carbon dioxide from air, dinitrogen oxide from air and for the separation of hydrocarbons, for example, the separation of alkenes, such as ethylene, propylene, etc., from alkanes, such as ethane, propane, etc., and the separation of straight-chain hydrocarbons from branched-chain hydrocarbons, e.g., the separation of n-butane from i-butane.

EXAMPLES

The invention is described in further detail in connection with the following examples which illustrate or simulate various aspects involved in the practice of the invention. All changes that come within the spirit of the invention are intended to fall within the scope of the claimed invention. Accordingly, these examples are not presented to limit, but only to illustrate, without limitation, certain embodiments of the claimed invention.

Example 1

Adsorbent Paper Media Production

Adsorbent paper media samples are made by the addition of 4.76 ml of 1.5M LiOH to 3 L of water with measured and/or adjusted specific conductance, sometimes also referred to as conductivity. The specific conductance was measured using Mettler Toledo SevenMulti™ meter equipped with InLab® 740 conductivity probe. The 3 L water was prepared by mixing tap water (conductivity 280 µS·cm$^{-1}$, 8 ppm Na$^+$, 1.3 ppm K$_+$, 13 ppm Mg$^{2+}$, 37 ppm Ca$^{2+}$) with deionized water from U.S. Filter Service Deionization, mixed bed type I (conductivity. 0.4 µS·cm$^{-1}$, 0.2 ppm Na$^+$, 0.1 ppm K$^+$, 0.01 ppm Mg$^{2+}$ and Ca$^{2+}$).

A total of 4.8 g solids are added to the LiOH-water in the amounts shown in Table 1, according to the following procedure.

Aramid fibers (Twaron® Aramid 1094 from Teijin), optionally a 2$^{nd}$ fiber (among Twaron® Aramid 1099, Twaron® Jet-Spun Fibrids both from Teijin, Vectran® HS Pulp from Engineered Fibers Technologies and CFF® 114-3 from Sterling Fibers) and LiX zeolite powder (UOP molecular sieve; 1.0-1.05 Si/Al ratio) are added to the LiOH-water. The mixture is placed in high shear blender and blended for 1 minute. The slurry is then transferred to a feed tank of a laboratory paper machine along with an additional liter of water with measured and/or adjusted conductivity. While the slurry is stirred (440 rpm), a colloidal silica (Ludox® SM-30 and AS-40 by Sigma-Aldrich) is added at 3% of the total solids weight. After an additional minute of stirring, a flocculant (Percol® 175 and 292 from Ciba Specialty Chemicals Corporation) is added dropwise until complete flocculation is reached. The resultant furnish is homogenized for an additional minute, then run through the paper machine to form a sheet. The sheet is then dewatered in a roll press and placed in a sheet dryer for at 80-140° C. for 15 to 20 minutes.

TABLE 1

| Sample | Total Solids, g | Aramid | 2nd fiber | LiX Zeolite | Flocculant | SiO2 |
|---|---|---|---|---|---|---|
| | | Amounts in wt. %, based on total solids | | | | |
| 1 | 4.80 | 15.91 | 1.78 | 78.89 | 0.25 | 3.17 |
| 2 | 4.79 | 15.95 | 1.78 | 79.05 | 0.32 | 2.89 |
| 3 | 4.80 | 17.74 | 0 | 78.93 | 0.34 | 2.98 |
| 4 | 4.84 | 18.04 | 0 | 78.80 | 0.25 | 2.90 |
| 5 | 4.80 | 17.80 | 0 | 78.88 | 0.37 | 2.96 |
| 6 | 4.80 | 17.79 | 0 | 78.87 | 0.37 | 2.97 |
| 7 | 4.80 | 17.80 | 0 | 78.91 | 0.37 | 2.93 |
| 8 | 4.79 | 16.05 | 1.78 | 78.96 | 0.23 | 2.99 |
| 9 | 4.79 | 16.05 | 1.78 | 78.97 | 0.26 | 2.94 |
| 10 | 4.80 | 15.96 | 1.77 | 78.86 | 0.43 | 2.99 |
| 11 | 4.80 | 15.96 | 1.90 | 78.86 | 0.35 | 2.93 |
| 12 | 4.80 | 15.95 | 1.98 | 78.82 | 0.28 | 2.96 |
| 13 | 4.81 | 15.91 | 1.97 | 78.77 | 0.34 | 3.00 |
| 14 | 4.78 | 16.01 | 1.78 | 79.11 | 0.26 | 2.85 |
| 15 | 4.79 | 15.93 | 1.78 | 79.01 | 0.26 | 3.03 |
| 16 | 4.79 | 15.94 | 1.78 | 79.08 | 0.26 | 2.95 |
| 17 | 4.80 | 15.96 | 1.77 | 79.02 | 0.26 | 2.99 |
| 18 | 4.81 | 15.92 | 1.78 | 78.72 | 0.40 | 3.18 |
| 19 | 4.81 | 15.94 | 1.78 | 78.80 | 0.39 | 3.10 |
| 20 | 4.80 | 15.90 | 1.77 | 78.96 | 0.36 | 3.00 |
| 21 | 4.79 | 15.92 | 1.78 | 79.03 | 0.33 | 2.93 |
| 22 | 4.79 | 16.84 | 0.90 | 78.99 | 0.26 | 3.01 |

Several parameters in the above procedure were varied for some of the samples. Sample 19 was very similar to Sample 18, but in this case only 1 L of water was added and LiOH was not added to the water. Sample 21 was similar to Sample 22, except for the addition of LiCl to the slurry which was made with municipal tap water with conductivity 288 µS/cm, while Sample 17 was also similar to Sample 22 except with the variation of using 0.42 µS/cm conductivity DI water instead of tap water and adding the LiOH after the zeolite had already been added to the slurry.

Example 2

Adsorption Capacity

The adsorption capacity was tested in a gravimetric balance (VTI MB-300 GHP). The paper samples prepared above are cut into narrow strips (0.5 cm×4 cm). Three to four narrow strips are rolled and loaded in a sample holding basket. The automated procedure then goes through few steps: 1) evacuation to pressure below 1 ton, 2) heating to the set up temperature at a rate of $5°·min^{-1}$, 3) cooling down in Helium to test temperature of 20° C., 4) evacuation to pressure below 1 ton. At this point the isotherms of Helium, Oxygen and Nitrogen are collected, separated from each other by steps 1) to 4) above. The isotherms are measured by the consecutive introduction of the studied adsorbate gas at the targeted pressures. The weight change is monitored until the equilibrium criteria is met—a change in two consecutive measurements below 0.0010 wt %. Once the criteria is met, the data is recorded and the procedure advanced to the next pressure point. The adsorptions are run from 1 to 4000 ton and then desorption points are collected. The data collected from the Helium isotherm is used for buoyancy corrections, which can become important at high pressures.

Some samples are activated at different set temperatures of step 2) above—from 140 to 350° C. In addition, some samples are heated ex situ to 350° C. in an air-filled oven, before being placed in the gravimetric balanced and reactivated there.

The maximum $N_2$ (Max $N_2$) and maximum $O_2$ (Max $O_2$) values in Table 2 below are the wt. % of $N_2$ and $O_2$ adsorbed at 4000 ton respectively. The difference between Max $N_2$ and Max $O_2$ is ΔMax. ΔMax is a measure of performance in the air separation process, as it expresses the preference toward $N_2$ adsorption over that of $O_2$. In other words, a higher ΔMax value of a sample is indicative of its better separation properties.

TABLE 2

| Sample | Conductivity (µS/cm) | Li:Al Zeolite powder | Li:Al Media | Na:Al Media | Ca × 2:Al Media | Li—Na—Ca × 2 Cation Balance Media | Max $N_2$ | Max $O_2$ | ΔMax | ΔMax Normalized to % Zeolite ($\Delta Max_{norm}$) |
|---|---|---|---|---|---|---|---|---|---|---|
| 1 | 16.61 | 0.98 | 0.958 | 0.008 | 0.033 | 0.999 | 6.419 | 2.661 | 3.758 | 5.04 |
| 2 | 46.3 | 0.98 | 0.918 | 0.011 | 0.077 | 1.005 | 6.370 | 2.665 | 3.705 | 4.96 |
| 3 | 32.2 | 0.98 | 0.942 | 0.010 | 0.056 | 1.008 | 6.321 | 2.624 | 3.697 | 4.91 |
| 4 | 0.63 | 0.98 | 0.954 | 0.006 | 0.008 | 0.968 | 6.154 | 2.564 | 3.589 | 4.88 |
| 5 | 0.44 | 0.98 | 0.939 | 0.019 | 0.014 | 0.972 | 6.179 | 2.743 | 3.436 | 4.60 |
| 6 | 0.54 | 0.98 | 0.953 | 0.021 | 0.013 | 0.987 | 5.886 | 2.527 | 3.359 | 4.48 |
| 7 | 33.0 | 0.98 | 0.933 | 0.024 | 0.063 | 1.019 | 5.929 | 2.609 | 3.320 | 4.45 |
| 8 | 16.9 | 0.98 | 0.936 | 0.021 | 0.037 | 0.994 | 6.007 | 2.630 | 3.377 | 4.44 |
| 9 | 0.42 | 0.98 | 0.947 | 0.018 | 0.015 | 0.980 | 5.932 | 2.544 | 3.388 | 4.43 |
| 10 | 46.5 | 0.98 | 0.958 | 0.028 | 0.084 | 1.069 | 5.867 | 2.580 | 3.287 | 4.36 |
| 11 | 32.2 | 0.98 | 0.93 | 0.022 | 0.063 | 1.015 | 5.700 | 2.441 | 3.259 | 4.30 |
| 12 | 58.1 | 0.98 | 0.905 | 0.029 | 0.109 | 1.043 | 5.831 | 2.595 | 3.236 | 4.27 |
| 13 | 60.4 | 0.98 | 0.89 | 0.025 | 0.110 | 1.025 | 5.571 | 2.408 | 3.163 | 4.18 |
| 14 | 60.4 | 0.98 | 0.91 | 0.026 | 0.111 | 1.047 | 5.532 | 2.402 | 3.130 | 4.15 |
| 15 | 60.4 | 0.98 | 0.89 | 0.026 | 0.110 | 1.026 | 5.461 | 2.374 | 3.087 | 4.12 |
| 16 | 32.2 | 0.98 | 0.95 | 0.023 | 0.065 | 1.038 | 5.615 | 2.430 | 3.185 | 4.04 |
| 17 | 0.42 | 0.98 | 0.97 | 0.046 | 0.010 | 1.026 | 4.974 | 2.096 | 2.878 | 3.86 |
| 18 | 0.42 | 0.98 | 0.89 | 0.043 | 0.010 | 0.943 | 4.927 | 2.152 | 2.775 | 3.74 |
| 19 | 0.42 | 0.98 | 0.88 | 0.045 | 0.010 | 0.935 | 4.763 | 2.022 | 2.741 | 3.68 |
| 20 | 60.4 | 0.98 | 0.88 | 0.024 | 0.111 | 1.016 | 5.090 | 2.352 | 2.738 | 3.67 |
| 21 | 288.8 | 0.98 | 0.76 | 0.047 | 0.359 | 1.167 | 4.134 | 1.953 | 2.181 | 2.91 |
| 22 | 288.8 | 0.98 | 0.61 | 0.072 | 0.449 | 1.131 | 4.056 | 1.996 | 2.060 | 2.73 |

Columns 3-7 of Table 2 describe the quantity of particular ions in the zeolite material both prior to the media fabrication and after the paper media is made. The cation quantities are given as the fraction, or ratio, of total cation exchange equivalents in the zeolite (which is essentially equal to the moles of aluminum in a defect-free zeolite). The percentage of total cation equivalents attributable to each ion of interest is therefore the ratio of cation equivalents from the table multiplied by 100.

Column 3 (Li:Al Zeolite Powder) lists the lithium content as a ratio of the total cation equivalents in the starting LiX zeolite powder, which is 0.98, or 98% in terms of percentage of exchange equivalents for each experiment outlined in Table 2.

Columns 4 through 6 (Li:Al Media, Na:Al Media, Ca×2:Al Media, respectively) list the ratios of the total cation equivalents for each cation in the LiX zeolite contained in the paper media. For example, Sample 1, whose composition is described in row 1 of the table, contains a Li:Al ratio of 0.958, a Na:Al ratio of 0.008, a Ca×2:Al ratio of 0.033 (where Ca is multiplied by 2 to account for its divalent charge and thus 2 equivalents of cation charge per mole of $Ca^2$). In percentages of cation equivalents, the ratios for the three cations are therefore 95.8%, 0.8%, and 3.3% for $Li^+$, Na and $Ca^{2+}$, respectively. Column 7 (Li—Na—Ca×2 Cation Balance Media) gives the sum total cation composition, or the cation balance, as a ratio of total cation exchange equivalents of the zeolite. This number should be close to 1.00, and quantities within ±10% of 1.00 are considered to be in balance within experimental error. Cation balance ratios that are more than 10% lower than 1.00 are at least slightly decationized, or possessing protons ($H^+$) balancing some of the charge in the zeolite. Cation balance ratios that are more than 10% higher than 1.00 typically contain slight excesses of $Ca^{2+}$ which in this case are present as $CaOH^+$ cations, thereby only balancing a single cation exchange equivalent per $CaOH^+$ cation instead of the expected two cation equivalents per $Ca^{2+}$.

The finished media LiX has a monovalent cation in a range from 0.05% to 3%, based on the total equivalents of exchangeable cations in the finished media LiX, wherein the monovalent cation is selected from the group consisting of Na, K, Rb, Cs, and combinations thereof.

The finished media LiX has a divalent cation content in a range from 0.05% to 15%, based on the total cation equivalents in the finished media LiX, wherein the divalent cation is selected from the group consisting of Ca, Mg, Sr, Ba, and combinations thereof.

The data for each sample has been normalized in the left-hand column to provide a ΔMax value normalized to the weight percent of LiX zeolite in the respective paper media, also denoted as $\Delta Max_{norm}$. Samples 1-16 have a normalized $\Delta Max_{norm}$ value≧4, which is an indicator of good adsorption performance.

In contrast, Samples 17-22 show relatively poor adsorption performance. As illustrated in Table 1, Samples 17-22 have higher Na, higher Ca, and/or lower Li—Na—Ca/2 cation balance, as compared with Samples 1 through 16. For example, Sample 17 has the highest Li:Al ratio and the highest Li—Na—Ca/2 cation balance. However, the Na:Al is also very high, resulting in poorer adsorption performance.

Therefore, surprisingly and unexpectedly, the detrimental effect of Na:Al to $\Delta Max_{norm}$ is 6-7 times greater that that of the Ca×2:Al in this experimental study. Accordingly, applicants have discovered that the separation performance of an adsorbent media comprising a lithium-exchanged zeolite (e.g., paper media comprising LiX, as in this study) is more resistant to the detrimental effect of Li displacement, where the Li is displaced by a divalent Group 2 cation, rather than another monovalent Group 1 cation.

Although the media has been described in terms of exemplary embodiments, it is not limited thereto. Rather, the appended claims should be construed broadly to include other variants and embodiments which may be made by those skilled in the art without departing from the scope and range of equivalents. This disclosure is intended to cover any adaptations or variations discussed herein.

The invention claimed is:

1. An adsorbent media composition comprising: a first media component material selected from the group consisting of polymeric fibers, inorganic fibers, natural fibers, carbon fibers and mixtures thereof; a second media component material having at least 30 weight percent of an adsorbent composition comprising a finished media lithium-exchanged zeolite X (LiX), the finished media LiX having a finished Li content, wherein the finished media LiX is derived from a LiX precursor having a pre-media production Li content; wherein (a) the finished media LiX Li content is reduced relative to the LiX precursor Li content, (b) the finished media LiX Li content is in a range from 96% to 83%, based on the total cation equivalents in the LiX, and (c) the adsorbent media composition is obtained from a slurry mixture comprising water, the pre-media production LiX and the first media component material, wherein (i) the water has a specific conductance in a range from 2.2 .mu.Siemens/cm to 150 .mu.Siemens/cm; (ii) the finished media LiX has a monovalent cation content in a range from 0.05% to 3%, based on the total equivalents of exchangeable cations in the finished media LiX, wherein the monovalent cation is selected from the group consisting of Na, K, Rb, Cs, and combinations thereof; and (iii) the finished media LiX has a divalent cation content in a range from 0.05% to 15%, based on the total cation equivalents in the finished media LiX, wherein the divalent cation is selected from the group consisting of Ca, Mg, Sr, Ba, and combinations thereof.

2. The media of claim 1, wherein the water used to make the slurry mixture has concentrations of monovalent cations and divalent cations, respectively, wherein the total moles of monovalent cations in the water are less than or equal to 3% of the total lithium equivalents in the original zeolite and the total moles of divalent cations in the water are less than or equal to 15% of the total lithium equivalents in the zeolite, so that the finished media LiX has a monovalent cation content in the range from 0.05% to 3%, based on the total percent of exchangeable cations in the finished media LiX.

3. The media of claim 1, wherein the zeolite X has a Si/Al ratio from 1.0 to 1.5.

4. The media of claim 1, comprising at least 60 weight-percent of adsorbent.

5. The media of claim 1, having a substantially uniform thickness of 0.10 mm to 1.00 mm.

6. The media of claim 1, wherein the polymeric fiber is a para-aramid.

7. The media of claim 1, wherein the slurry mixture further comprises organic latex and inorganic oxide binders.

8. A method for separating a gas mixture having at least a first gas component and a second gas component, the method comprising: introducing the gas mixture into an adsorption zone having at least the adsorbent media composition of claim 1, 2, 3, 4, 5, 6, or 7, and recovering a gas product stream enriched in the at least first gas component, which is less preferentially adsorbed by the finished media LiX relative to the at least second gas component.

9. The method of claim 8, wherein the gas mixture is air and the at least first gas component is oxygen and the at least second gas component is nitrogen.

* * * * *